L. H. DYER.
MOTOCYCLE.
APPLICATION FILED JUNE 18, 1909.
985,517.
Patented Feb. 28, 1911.
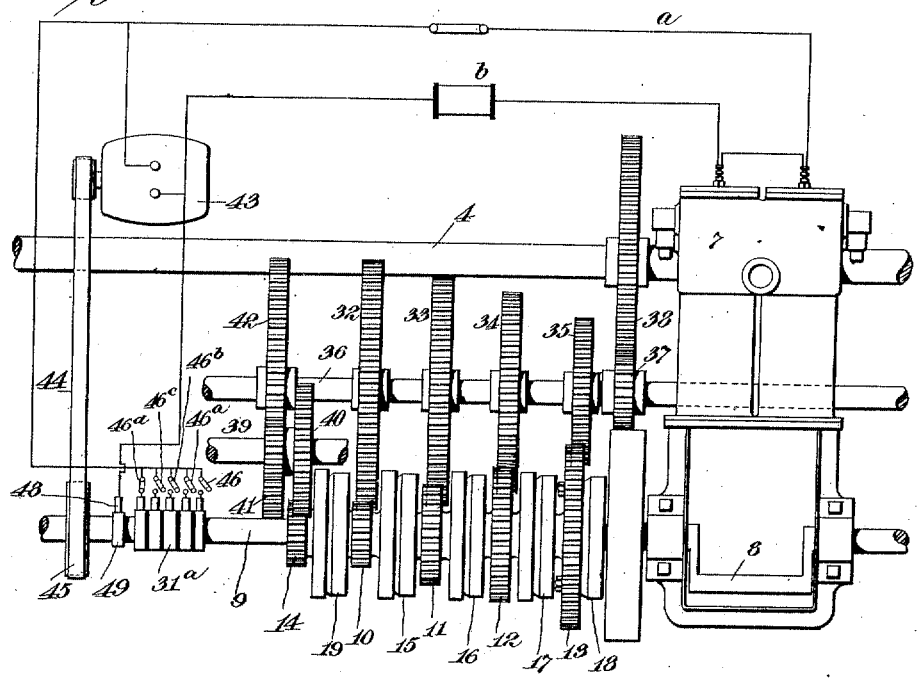
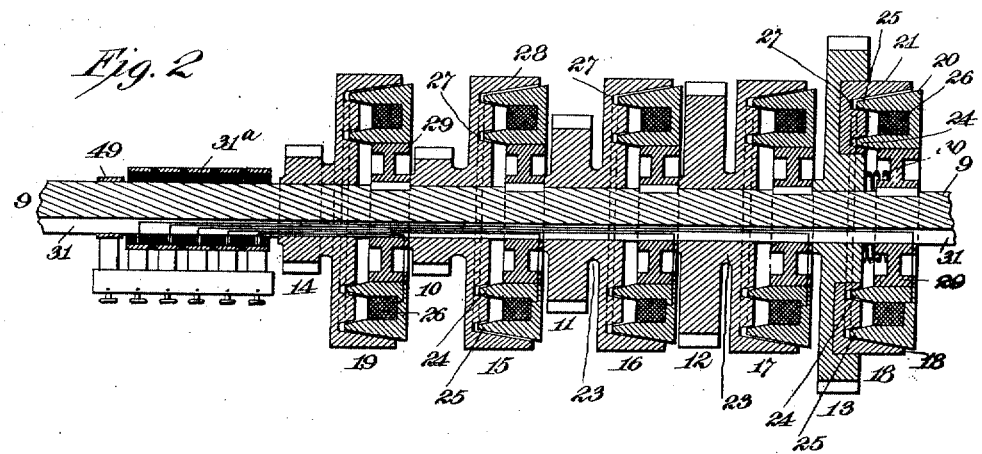
Witnesses:
J. F. Coleman
John T. Totsh
Inventor
Leonard Huntress Dyer
by Dyer & Dyer
Att'ys

UNITED STATES PATENT OFFICE.

LEONARD HUNTRESS DYER, OF GREENWICH, CONNECTICUT.

MOTOCYCLE.

985,517.      Specification of Letters Patent.      Patented Feb. 28, 1911.

Original application filed September 22, 1897, Serial No. 652,532. Divided and this application filed June 18, 1909. Serial No. 502,871.

*To all whom it may concern:*

Be it known that I, LEONARD HUNTRESS DYER, a citizen of the United States, residing at Greenwich, in the county of Fairfield, State of Connecticut, have invented certain new and useful Improvements in Motocycles; and I do hereby declare the following to be a full, clear, and exact description of the invention, which will enable others skilled in the art to which it appertains to make and use the same.

My invention relates to various new and useful improvements in motocycles or automobile vehicles, and more particularly it relates to means for controlling the speed of such vehicles, and is a division of an application for patent filed by me September 22, 1897, Serial No. 652,532.

The invention comprises a suitable propelling motor or engine carried on the vehicle; with suitable gearing interposed between said motor and the vehicle shaft by which different speeds may be secured; an electric generator operated by said motor; the several sets of gears being provided with electrically operated clutches; and suitable electric controlling mechanism by which the current from the generator will be supplied successively to the said clutches, whereby the different variations in speed may be obtained. Preferably the motor or engine which is employed is an explosive engine, and with such a motor the electric generator will also be used for igniting the charge.

By means of my present improvement the speed of motocycles may be better regulated than with any of the mechanically operated devices with which I am familiar, and at the same time the changes in speed will be effected more easily and by means of lighter, simpler and more compact mechanism.

In order that my invention may be better understood, attention is directed to the accompanying drawings forming a part of this specification, and in which—

Figure 1 is a plan view of the operating engine or motor and the intermediate gears, and Fig. 2 is an enlarged section illustrating one form of electric clutch.

In all of the above views corresponding parts are represented by the same numerals.

The carriage or vehicle is of an ordinary type, having a driving axle 4; 7 represents the driving motor or engine, that shown being a well known type of double cylinder explosive engine.

While I prefer to employ an explosive engine for the purpose, owing to its lightness, simplicity and compactness, it will be understood that any other improved form of motor may be made use of. When a double cylinder explosive engine is used, its crank 8 may be formed integral with the main driving shaft 9, the latter being carried in suitable bearings on the vehicle. The said shaft 9 is provided with a plurality of gears 10, 11, 12, and 13 thereon, which in this instance will allow for four speeds forward and with a single gear 14, allowing for a single speed backward.

Interposed between the gears 10, 11, 12, 13 and 14, and the shaft 9, are electric clutches 15, 16, 17, 18 and 19 respectively, which are adapted to be successively operated to allow the carriage to be driven forward at the desired speed or to allow the same to be propelled backward. Any suitable form of electric clutch may be used, and it is possible to employ either jaw clutches or friction clutches. I prefer, however, to make use of electric friction clutches, since such clutches allow for considerable slip and thereby relieve the engine and driving mechanism of the strains which would be experienced if jaw clutches were used, and at the same time making the changes in speed comparatively gradual.

In the drawings I illustrate a convenient form of electric friction clutch which may be used with my present invention, and in order that this clutch may be better understood, attention is particularly directed to Fig. 2 of the drawings. The friction clutch illustrated in this view comprises essentially a magnetic member 20, and an armature member 21, the former being preferably keyed directly to the shaft 9, and the latter being carried by the several gears which are capable of longitudinal movement on said shaft, thereby doing away with the necessity of keys for the sliding members. In the case of the gear 13, which is larger than the clutch, it is possible to carry the armature member directly upon one face of said gear as shown in Fig. 2, the said armature member being suitably secured in place, but with the other gears which are smaller than the clutch, it is desirable to carry the armature member upon the sleeve 23, cast integral with each gear.

The magnetic member 20 of each electric friction clutch comprises a trough shaped circular casting, having tapered pole pieces or rims 24, 25, the coil 26 being seated between said pole pieces as shown. The armature member 21 is provided with pockets 27, 27, with which the pole pieces of the magnetic member are adapted to engage, said armature member being also provided with a large overhanging rim 28 with which the outer face of the magnetic member may engage to form an increased frictional surface as will be understood. The magnetic member of each clutch is preferably keyed to a suitable spider 29, which in turn is keyed to the shaft 9, so as to hold the magnetic member of each clutch rigidly in position. The armature member of each clutch, however, is adapted to be moved toward and away from the magnetic member, the several gears being for this purpose loosely mounted upon the shaft 9, whereby the necessity of employing sliding keys is done away with. The two members of each clutch are preferably normally separated by means of a spring 30, but if desired the said springs may be dispensed with. The connections to each coil 26 is effected by insulated wires embedded in a slot 31, cut in the shaft 9 and leading to insulated contact rings 31ª, one of said rings being therefore used for each clutch. The return or ground connection from each coil may be carried directly to the shaft 9, as will be understood.

In the particular example of my invention illustrated in the drawings, the gears 10, 11, 12 and 13, mesh with gears 32, 33, 34 and 35 respectively, keyed to the countershaft 36 mounted in suitable bearings, the sizes of the several pairs of gears being proportioned to effect the desired speed of the driving axle 4. Power is communicated from the countershaft 36 to said driving axle through a pinion 37, keyed to said countershaft and meshing with a gear 38 keyed to said driving axle. Backward movement of the driving axle 4 is effected in this particular instance by providing a second countershaft 39, in which is keyed a gear 40, with which the gear 14 engages, said gear 40 driving a pinion 41, meshing with a larger gear 42 on the countershaft 36, whereby a very slow backward speed will be obtained.

In order to operate the several clutches, I provide an electric generator 43 of any suitable type, which may be driven by a belt 44 from a pulley 45 on the shaft 9, or in any other suitable way. The said motor or engine being an explosive engine, the said electric generator is utilized for igniting the charge by connecting the generator electrically with the engine, as will be understood, through the wires $a$. The usual sparking coil $b$ is shown in the circuit $a$. The current required to explode the charge in the engine will be taken intermittently from the generator. This absorption of current not being continuous, the grip of the magnetic clutches will not be affected.

In order that the current produced by the generator 43 may be controlled, any suitable switch device may be used, that shown in Fig. 1 being merely illustrative of many forms of such devices. Said switch comprises a number of switches 46, 46ª, 46ᵇ, 46ᶜ, 46ᵈ, which switches are connected to one pole or brush of the generator 43, the other pole or brush thereof being suitably grounded, such as through a brush 48 (see Fig. 1) engaging a collecting ring 49 on the shaft 9. The several switches 46, 46ª, 46ᵇ, 46ᶜ and 46ᵈ are each arrayed to be independently actuated so as to independently energize the electric clutches.

It will be seen that as the switches 46, 46ª, 46ᵇ, 46ᶜ and 46ᵈ are moved into engagement one or the other of the friction clutches will be energized so as to positively drive one or the other of the gears 10, 11, 12, 13 or 14, by which the desired speed may be obtained, or backward movement of the vehicle effected.

The operation of the specific form of my invention illustrated in the drawings is as follows: The switches 46, 46ª, 46ᵇ, 46ᶜ and 46ᵈ being cut out, no current will pass to any of the clutches and therefore the parts will be in the position shown in Fig. 2, the magnetic members of the several clutches turning with said shaft but not engaging any of the armature members. The engine or motor 7 will therefore be entirely disconnected from the driving axle, and said motor or engine is then started in the usual way. With the explosive engine a primary or storage battery is preferably employed for starting the same, as is now common when such explosive engines are provided with electric generators operated from the fly wheel. When the explosive engine has been started, the primary or secondary battery is cut out and the charge therefor is ignited from the dynamo or other generator 43. When it is desired to start the carriage forward, the first switch 46 is closed. Current will therefore flow from the generator to the switch, thence to the coil of the clutch for the gear 10 and is grounded into the shaft 9 which will be in circuit with the other brush of the dynamo. The passage of current through the coil of the clutch for the gear 10 will energize the magnetic member thereof and attract its armature member, moving said armature member and the gear 10 longitudinally on the shaft 9. As soon as the friction surfaces are in engagement, the gear 10 will be rotated by the shaft 9, and will communicate its movement to the gear 32 to drive the countershaft 36 from which the driving axle 4 will be driven through the pinion 37 and gear 38. In starting up from rest to the speed effected by the particular gears which are now being considered, there will be some slip between the friction surfaces so that the acceleration will be gradual and at the same the strain upon the driving axle and the gears will be reduced. If a higher speed is desired, the switch 46$^a$ is closed, thereby directing the current into the clutch for the gear 11, and demagnetizing the clutch for the gear 10. It will therefore, be seen that by means of my present invention, changes in speed are effected by closing the switch connected to the particular circuit desired and that reverse movement of the vehicle will be effected by closing the switch which controls the clutch for the reverse gears.

In accordance with the provisions of the patent statutes, I have described the principle of my invention, together with the apparatus which I now consider to represent the best embodiment thereof; but I desire to have it understood that the apparatus shown is merely illustrative and that the invention can be carried out in other ways.

Having now described my invention, what I claim as new and desire to secure by Letters Patent is:

1. In combination with an engine of the internal combustion type, of an electric generator and a movement transmitting mechanism, including a magnetic clutch, driven thereby, means for diverting a portion of the generated current for the purpose of igniting the charge in the engine, and means for using another portion of the generated current to actuate the clutch, substantially as set forth.

2. In a motocycle, the combination of an explosive engine or motor, gearing between said engine and the main driving axle of the vehicle, said gearing being normally inactive, whereby power from the engine will not be transmitted to the driving axle, an electric clutch for actuating said gearing to transmit power from the driving axle, a common source of electricity for igniting the charge of the explosive engine and for operating said electric clutch, and means for controlling the current to said clutch, substantially as set forth.

This specification signed and witnessed this 16th day of June, 1909.

LEONARD HUNTRESS DYER.

Witnesses:
JOHN L. LOTSCH,
P. T. WARD.

---

Copies of this patent may be obtained for five cents each, by addressing the "Commissioner of Patents, Washington, D. C."